United States Patent Office 3,749,700
Patented July 31, 1973

3,749,700
POLY(PHENYLENECARBIDES)
Robert D. Stephens, Berkeley, and William C. Kray, Jr., Richmond, Calif., assignors to Shell Oil Company, New York, N.Y.
No Drawing. Continuation-in-part of abandoned application Ser. No. 688,975, Dec. 8, 1967. This application July 6, 1970, Ser. No. 52,735
Int. Cl. C08f 9/00
U.S. Cl. 260—80 P   3 Claims

ABSTRACT OF THE DISCLOSURE

Poly(o-phenylenecarbide) and poly(m-phenylenecarbide) are novel polymers. They are fusible, soluble in a variety of solvents, and are also convertible by thermal treatment at an elevated temperature to a carbon structure which is dimensionally stable and extremely resistant to loss of weight at temperatures as high as 1000° C. These novel polymers are capable of dissolving large amounts of compounds of certain transition metals. Upon thermal treatment, such solid solutions provide a carbon structure having metal compound homogeneously distributed therein as submicroscopic particles.

---

This is a continuation-in-part of copending application Ser. No. 688,975 filed Dec. 8, 1967, now abandoned.

BACKGROUND OF THE INVENTION

Field of the invention

This invention is directed to novel acetylenic polymers and to novel methods for providing thermally extremely stable articles.

Discussion of the prior art (1) Acetylenic polymers.—Acetylenic polymers of various types have been described in the literature. Thus, it is known to polymerize acetylenic compounds by ionic catalysis to polymers having straight carbon backbones, as described, for example, in U.S. 2,961,330 to Meriwether. Polymers of that type, produced by polymerization of phenylacetylene, are described in U.S. 3,051,693 to Leto.

Poly-diethynyl benzenes and their preparation are described in English Pat. 971,170 to General Electric Company.

Those previously known polymeric compounds of the above type which include aromatic rings are, as a rule, insoluble, unreactive, and infusible. They are characterized by the chemist as "brick dust" because of their intractable nature.

Poly(meta-diethynyl benzene), disclosed in said British patent, is somewhat less intractable than the others, being soluble to some extent. However, it is physically still a quite unmanageable substance and has the undesirable property of readily decompositing at a relatively low temperature.

(2) Polymers for use at high temperatures.—Substantial advances have been made in recent years in the production of polymeric materials which are resistant to extremely high temperature environments. The state of this art in 1965 is summarized in U.S. government document AFML-TR-65-29 "Air Forme Materials Symposium/1965—Technical Papers—May 1965." Organic polymers described in that volume, which are desirable because of their resistance to degradation, i.e., weight loss or dimensional change, at high temperatures, are expensive materials obtained by complex reactions.

One of the most desirable materials for use at high temperatures is pure carbon. The polymers of the present invention can be readily molded or deposited from solution and thermally converted to carbon articles of the same shape. This invention thus provides a novel, easily practiced method for producing high-temperature-resistant carbon shapes.

(3) Preparation.—Polymers of the present invention can be produced by a modification of a chemical reaction which has been described by one of the present inventors and another for the preparation of certain tolanes and heterocyclic compounds (Stephens et al., Journ. Org. Chem., 28, 3313–3315). The reactions described therein consist essentially of reacting an aryl iodide compound with a cuprous acetylide in refluxing pyridine under a nitrogen atmosphere.

SUMMARY OF THE INVENTION

This invention provides polymers having regularly alternating phenyl and ethynyl groups. We designate these polymers poly(phenylenecarbide). Representative of the polymers of this invention is poly(o-phenylenecarbide) which has the repeating unit

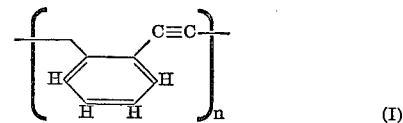

(I)

and poly(m-phenylenecarbide) which has the repeating unit

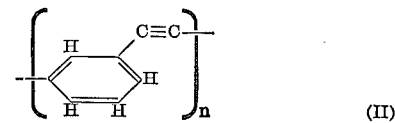

(II)

In Formulas I and II, $n$ is equal to or greater than 4.

The ortho- and meta-phenylenecarbide polymers are fusible, relatively thermally stable compounds which are soluble in a variety of solvents. They decompose slowly at temperatures between 150 and 500° C. By heating to about 500° C. they are readily converted to a material having an extremely low hydrogen content, consisting typically of a turbostratic carbon structure.

The polymers of this invention can be shaped by conventional molding or solution procedures to produce fibers, coatings, firms, or other shaped articles, which can then be thermally converted to extremely heat resistant carbon articles of the same shape.

The polymers of this invention and certain of their solutions are capable of dissolving certain transition metal compounds, e.g., cuprous salts. The resulting solutions can thereafter be converted by appropriate procedures into shaped carbon articles containing the metal compounds in substantial concentration, e.g. up to 40% w. or more (based on metal), in the form of molecular or near-molecular submicroscopic particles.

It is, of course, possible to convert materials known to the prior art to carbon. A special advantage of the polymers of this invention, when used as the basis of manufacture of carbon articles, arises out of their extremely high carbon content, i.e., about 96% weight. It is a consequence of this ratio that there is no tendency toward uncontrolled reaction when the polymers are heated in an inert atmosphere to the temperature around 500° C. which is desired for thermal conversion and that the weight loss and change in dimensions during such conversion are minimal. On heating finely divided poly(o-phenylene carbide) in an air stream above 500° C., a weight loss was observed; but the residue was stable even in the air stream at 1000° C. There was no uncontrolled burning of violent reaction.

DESCRIPTION OF PREFERRED EMBODIMENTS

A convenient method for producing the polymers of the present invention consists of heating iodo-cuprous phenyl acetylide in a suitable solvent, such as pyridine or dimethylformamide, under a nitrogen atmosphere. Use of the ortho-structured monomer results in production of the ortho-structured polymer. Similarly, the meta- and para-monomers result in meta- or para-structured polymers.

Other methods may be employed to produce the novel polymers described and claimed herein, e.g., by reaction of di-iodo-benzene with cuprous acetylide under similar reaction conditions. Here again the ortho-, meta-, or para-structured monomers produce, respectively, ortho-, meta-, or para-structured polymers.

It will be realized that the polymerization reaction does not result in a compound having a single formula, but in a mixture of polymers of different numbers of recurring units. Polymers according to the invention typically may have a number average of molecular weight ($\overline{M}_n$) in the range from 400 to 10,000 and may contain polymeric molecules having as little as two repeating units, i.e., $n=2$, or as many as 1000, but typically contain polymer molecules in which $n$ is from 4 to 100, preferably 6 to 100.

The structure of poly(ortho-phenylenecarbide) has been confirmed by elemental analysis, nuclear magnetic analysis, and infrared analysis.

The product of the reaction of ortho-iodo cuprous phenylacetylide in a solvent may contain a substantial amount of a crystallizable cyclic trimer which may be removed from the reaction product by conventional crystallization methods.

The polymer produced from ortho-iodocuprous phenyl acetylide contains about 1 to 2 iodine atoms per molecule. The iodine can be removed from the polymer by thermal treatment of the polymer, resulting in a thermal conversion residue which is free of iodine.

Poly(ortho-phenylenecarbide) and poly(meta - phenylenecarbide) of this invention are soluble in benzene, chloroform, toluene, pyridine, dimethylformamide, and other similar solvents. They are not soluble in saturated hydrocarbons or acetone. The ortho-polymer is completely miscible with chloroform, about 50 percent by weight soluble in benzene at room temperature, very soluble in pyridine, and moderately soluble in dimethylformamide. The meta-polymer is very soluble in chloroform and moderately soluble in benzene and pyridine.

A typical poly-(o-phenylenecarbide) polymer having an $\overline{M}_n$ of about 2000 to 10,000 is recovered as a highly colored powder which coalesces to a rubber-like mass at about 170° C.

The thermal conversion of the polymers of this invention is believed to be due to gradual cross-linking with evolution of hydrogen and conversion of the mass to a carbon structure. The molecular weight of the polymer is not significant for achieving this carbonization. A small amount of cross-linking begins at temperatures as low as 150° C. Complete thermal conversion is obtained by heating a polymer of this invention at 500° C. for a relatively short period, e.g., up to 10 minutes. Once the thermal conversion is complete, the polymer may be heated for long periods of time, e.g., an hour or more, at temperatures up to 1000° C. without further loss of weight. Thermal conversion of the polymer may be carried out in air or in an inert atmosphere. Burning of the polymer or other rapid degradation is not observed during such decomposition. The polymer mass retains its shape during thermal degradation.

The primary utility of the polymers of this invention having 4 or more monomer units is in the form of shaped, thermally converted masses, i.e., carbon structures. Thus, the polymers may be shaped by solution- or melt-spinning into fibers; by various molding processes or by solution-casting into films and coatings; and by extrusion, molding, or the like into articles of any desired shape. The resulting shaped articles can then be converted without substantial change in dimension and with very little loss in weight to highly thermally resistant articles consisting essentially of carbon.

The polymers of this invention have the property of dissolving transition metal compounds which react with the acetylenic bond, i.e., compounds of transition metals in the appropriate valence state, e.g., salts, such as halides, nitrates or perchlorates or ligands, such as carbonyl or acetonitrile, of copper, silver, gold, mercury, ruthenium, rhodium, palladium, rhenium, platinum, vanadium, chromium, manganese, iron, cobalt, nickel, molybdenum, tungsten, osmium and iridium. Many transition metal compounds may be dissolved in the polymer, and preferably may be dissolved in an appropriate solution of the polymer, e.g., a solution of the polymer in benzene, pyridine or dimethylformamide. These compositions of polymer and at least one transition metal may by chemical treatment be converted to a carbon structure having the metal compound distributed in homogeneous form in molecular or nearly molecular submicroscopic particles.

The thermally convertible polymers of this invention are useful for the forming of shaped articles which are to be exposed to high temperature conditions, such as coatings for the protection of materials which are to be exposed to high temperature and the like. Numerous uses for such materials are known; many are disclosed in the above-cited Air Force Materials Symposium.

The metal-containing carbonized polymers of this invention are particularly suitable for the production of radiation shields.

The following examples will illustrate preferred modes of practicing the invention, but are not to be considered a limitation of the invention. In the examples and throughout the specification, parts and percentages are by weight unless otherwise indicated.

EXAMPLE 1

200 ml. of dimethylformamide and 25 g. of o-iodocuprous phenylacetylide were placed in a 500 ml. flask fitted with a nitrogen inlet and outlet and stirrer. The flask was placed in an oil bath and heated with stirring to 110° for six hours. The reaction solution upon cooling was diluted with water and extracted with chloroform. The chloroform extract was washed with water. Removal of the chloroform solvent yielded 6.5 g. (90% of theory) of a black powder. This crude polymer, which contained cuprous iodide, was recrystallized from solution in a mixture of benzene and hexane. The purified, metal-free polymer, poly(o-phenylenecarbide), was submitted to carbon-hydrogen analysis: found (percent): C=95.5±0.4, H=3.8±0.4; theory: (percent): C=96.0, H=4.0. Number average molecular weight by membrane osmometry 5,500.

EXAMPLE 2

200 ml. of dry pyridine and 25 g. of o-iodocuprous phenylacetylide was placed in a 500 ml. flask fitted with a nitrogen inlet and outlet and stirred. The flask was placed in an oil bath and heated and stirring to 110° for six hours. The reaction solution was cooled, diluted with 500 ml. water and extracted with chloroform. The chloroform extracts were washed with dilute HCl and dried. Stripping of chloroform yielded 6.0 g. (83% of theory) of a dark reddish-brown powder. This crude polymer, which contained about 5% copper as cuprous iodide, was recrystallized from solution in a mixture of benzene and hexane. The purified, metal-free polymer poly(o-phenylenecarbide) was submitted to carbon-hydrogen analysis: found (percent): C=95.1±0.4, H=3.3±0.4, theory (percent): C=96.0, H=4.0. Number average molecular weight by membrane osmometry, 2,500.

EXAMPLE 3

10.0 mg. of the recrystallized polymer prepared in Example 1, placed on the pan of a Cahn microbalance, was heated at 5.0° C./minute from room temperature to 1000° C. in a nitrogen atmosphere. A weight loss of 5-6% at 500 to 550° C. was noted. Beyond 550° C., no weight loss was noted. Cooling and reheating of the polymer sample to 1000° C. caused no measurable weight loss (less than 1%).

EXAMPLE 4

A powdered sample of the recrystallized polymer obtained in Example 1 was pressed at 500 p.s.i. in a heated die (200° C.) to form a strong, brittle black disk. This disk showed no physical change when heated in a nitrogen atmosphere fo 900° C.

EXAMPLE 5

A concentrated solution (~50% w. in chloroform) of the recrystallized polymer product of Example 1 was allowed to evaporate on a polytetrafluoroethylene surface. A thin, continuous film was deposited on the surface.

EXAMPLE 6

Poly(m-phenylenecarbide) was prepared by substituting 11.5 g. of m-iodocuprous phenylacetylide for the ortho-monomer in the method of Example 1 and by substituting 2.5 g. of the meta-monomer for the ortho-monomer in the method of Example 2. Polymers were obtained in satisfactory yield in these runs.

EXAMPLE 7

A poly(o-phenylenecarbide) polymer prepared as in Example 2 was dissolved in toluene at about 25° C. resulting in a solution of about 1 gram of polymer to 13 ml. of toluene. N hexane was added in large excess (volume ratio of about 14:1 of solution) resulting in precipitation of about 32% by weight of the polymer. This insoluble fraction had a number average molecular weight by vapor pressure osmometry of 2400. Removal of the mixed solvent yielded the polymer which had not precipitated. Number average molecular weight by vapor pressure osmometry of this soluble fraction was 450.

EXAMPLE 8

1.18 g. of tris(acetonitrile) tungsten tricarbonyl (prepared by refluxing tungsten hexacarbonyl in acetonitrile) and 1.0 g. of poly(o-phenylenecarbide) were dissolved in 60 ml. of dry benzene and refluxed for 24 hours. The resulting 1.27 g. of polymer was fractioned with chloroform. The chloroform soluble fraction of the polymer (11% of total) contained 27.8% tungsten. The chloroform insoluble portion of the polymer contained 18.3% soluble and insoluble compositions, the tungsten compound was found widely dispersed in particles of about 100 A. or less, and predominantly below the 10 A resolution of the instrument.

We claim as our invention:

1. Poly(ortho-phenylenecarbide) repeating units of ortho-phenylenecarbide having a number average molecular weight determined by vapor pressure osmometry or membrane osmometry in the range of 400 to 10,000.

2. Poly(meta-phenylenecarbide) repeating units of meta-phenylenecarbide having a number average molecular weight determined by vapor pressure osmometry or membrane osmometry in the range of 2,000 to 10,000.

3. A polymer as in claim 1 having a number average molecular weight determined by vapor pressure osmometry or membrane osmometry in the range from about 2,000 to about 10,000.

References Cited

UNITED STATES PATENTS 3,309,456    1/1967    Hay _____ 94—1 X

OTHER REFERENCES

Chemische Berichte, vol. 91, pp. 1280–1285, 1958, by Drefahl and Plotner.

"Substitution of Aryl Iodides with Cuprous Acetylides" by Stephens et al.; Jour. Org. Chem., vol. 28, pp. 3313–3315.

JAMES A. SEIDLECK, Primary Examiner

W. F. HAMROCK, Assistant Examiner

U.S. Cl. X.R.

260—2 H, 93.5 S, 93.5 A, 94.1, 668 R, 80 L